US007905346B2

(12) United States Patent
Enomoto

(10) Patent No.: US 7,905,346 B2
(45) Date of Patent: Mar. 15, 2011

(54) BELT SKEW CORRECTION CONTROLLING METHOD, BELT TRANSPORTATION DEVICE, AND RECORDING APPARATUS

(75) Inventor: Katsumi Enomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 12/394,204

(22) Filed: Feb. 27, 2009

(65) Prior Publication Data

US 2009/0220873 A1 Sep. 3, 2009

(30) Foreign Application Priority Data

Feb. 28, 2008 (JP) ................................ 2008-048299

(51) Int. Cl.
*B65G 39/16* (2006.01)

(52) U.S. Cl. ....................................... 198/807; 474/102

(58) Field of Classification Search .......... 198/806–808; 399/165; 414/102–108; 474/102–108
See application file for complete search history.

(56) References Cited

U.S. PATENT DOCUMENTS 6,721,528 B1 * 4/2004 Schreieder et al. ........... 399/302
6,786,325 B2 * 9/2004 Powell .......................... 198/807
7,416,074 B2 * 8/2008 Otomo et al. ............ 198/810.03
2003/0136646 A1 * 7/2003 Powell .......................... 198/807
2005/0150747 A1 * 7/2005 Menendez et al. ........ 198/810.03
2007/0045939 A1 * 3/2007 Toya et al. ..................... 271/198
2007/0144871 A1 * 6/2007 Tao et al. ................. 198/810.03

FOREIGN PATENT DOCUMENTS

JP 06-056294 3/1994
JP 09169449 A * 6/1997
JP 2002-120425 4/2002
JP 2002-287527 10/2002
JP 2004-123349 4/2004
JP 2004123349 A * 4/2004
JP 2005-271320 10/2005
JP 2006-264934 10/2006
JP 2007-148113 6/2007

* cited by examiner

*Primary Examiner* — Mark A Deuble
(74) *Attorney, Agent, or Firm* — Workman Nydegger

(57) ABSTRACT

A belt skew correction controlling method includes detecting a skew speed of a wound endless belt, calculating a difference between the skew speed that is acquired in the detecting of the skew speed and the initial target value, determining whether a value acquired in the calculating of the difference is within a predetermined range, maintaining an angle of a skew correcting roller that is wound around the endless belt and can be inclined in a case where the value is determined to be within the predetermined range in the determining of whether the value is within the predetermined range.

9 Claims, 9 Drawing Sheets

BELT SKEW CORRECTION CONTROLLING METHOD, BELT TRANSPORTATION DEVICE, AND RECORDING APPARATUS

BACKGROUND

1. Technical Field

The present invention relates to a belt skew correction controlling method including displacing the angle of a skew correcting roller, a belt transportation device having the skew correcting roller, and a recording apparatus.

2. Related Art

In descriptions here, in recording apparatuses, an ink jet printer, a wire dot printer, a laser printer, a line printer, a copier, a facsimile machine, a printing apparatus, and the like are included.

Generally, as disclosed in Japanese Patent No. 3,082,452 and JP-A-2002-287527, belt transportation devices include a driving roller, a driven roller, an endless belt, and an inclination roller. Among these, the endless belt is wound around the driving roller, the driven roller, and the inclination roller. In addition, in the belt transportation devices, a sensor is configured to detect the position of the endless belt in the width direction over the entire peripheral face of the edge of the endless belt. In addition, it is configured that skew of the endless belt is controlled by displacing the direction of the inclination roller based on the detected position. Accordingly, the position of the endless belt in the width direction can be placed within a range to some degree.

However, the belt transportation device disclosed in Japanese Patent No. 3,082,452 is configured such that an inclination unit of the inclination roller is driven all the time. Accordingly, the skew speed of the endless belt varies, and accordingly, vibration in the width direction occurs. For example, in a recording apparatus, there is a problem that the precision of recording is decreased.

In addition, the belt transportation device disclosed in JP-A-2002-287527 is configured such that the inclination unit of the inclination roller is driven for correcting the position of the endless belt only. In addition, when the position of the endless belt is deviated much from a reference position located on the center in the width direction, the inclination roller is inclined much by the inclination unit. Accordingly, the position of the endless belt can approach the reference position. However, there is a problem that the skew speed becomes very high. In such a case, there is a problem that the precision of recording is decreased.

SUMMARY

An advantage of some aspects of the invention is that it provides a belt skew correction controlling method, a belt transportation device, and a recording apparatus capable of reducing and stabilizing the skew speed of the endless belt.

According to a first aspect of the invention there is provided a belt skew correction controlling method including: detecting a skew speed of a wound endless belt; calculating a difference between the skew speed that is acquired in the detecting of the skew speed and the initial target value; determining whether a value acquired in the calculating of the difference is within a predetermined range; maintaining an angle of a skew correcting roller that is wound around the endless belt and can be inclined in a case where the value is determined to be within the predetermined range in the determining of whether the value is within the predetermined range; and displacing the angle of the skew correcting roller to a side on which the value acquired in the calculating of the difference becomes closer to the initial target value in a case where the value is determined to be out of the predetermined range in the determining of whether the value is within the predetermined range.

According to the first aspect of the invention, the belt skew correction controlling method includes: the detecting of the skew speed; the calculating of the deviation; the determining whether the value is within the predetermined range; the maintaining of the roller angle; and the displacing of the roller angle. Accordingly, in the maintaining of the roller angle, so-called a dead band in which the angle of the skew correcting roller is maintained can be provided.

Here, the "dead band" represents a time or an area in which the angle of the skew correcting roller is not changed based on a detection operation performed by a detector or the like.

As a result, for example, when the endless belt transports a recording medium in the middle of a recording process in a recording apparatus, recording precision in the width direction of the recording medium with respect to the transport direction can be improved by the dead band. In other words, compared to a case where the skew speed is controlled by displacing the angle of the skew correcting roller all the time, occurrence of vibration and speed variations is suppressed, and the recording precision in the width direction can be improved.

In addition, in the determining whether the value is within the predetermined range, it is determined whether the value of a difference between the skew speed acquired in the detecting of the skew speed and the initial target value is within the predetermined range. In other words, the determination is made based on the skew speed. Accordingly, when the skew speed is relatively high, the skew speed can be reduced by performing the displacing of the roller angle. On the other hand, when the skew speed is relatively slow, the dead band may be set.

For example, when the determination is made based on the position of the endless belt only, the skew speed may be high even in a case where the position of the endless belt is within the allowed range. In such a case, there is a problem that the recording precision in the width direction is decreased.

In other words, according to this aspect, the determination is made based on the skew speed, and accordingly, the recording precision in the width direction can be improved assuredly, compared to a case where the determination is made based on the position of the endless belt only.

According to a second aspect of the invention, in the above-described first aspect, determining whether the value acquired in the calculating of the difference is positive or negative in a case where the value is determined to be out of the predetermined range in the determining of whether the value is within the predetermined range; and setting the target value to a positive value in the predetermined range in a case where the value is determined to be positive in the determining of whether the value is positive or negative, and setting the target value to a negative value in the predetermined range in a case where the value is determined to be negative in the determining of whether the value is positive or negative are further included. The angle of the skew correcting roller is displaced such that the value acquired in the calculating of the difference approaches the set target value set in the setting of the target value, in the displacing of the angle of the skew correcting roller.

According to the second aspect of the invention, in addition to the advantages of the first aspect, the determining of whether the value is positive or negative and the setting of the target value are included. In addition, the angle of the skew correcting roller is displaced such that the value acquired in the calculating of the difference approaches the set target value set in the setting of the target value, in the displacing of the angle of the skew correcting roller.

Here, after the value acquired in the calculating of the deviation approaches the set target value, the value acquired in the calculating of the deviation may exceed the set target value, that is, so-called overshoot.

In such a case, the value acquired in the calculating of the deviation can be placed near the initial target value in the predetermined range. In other words, the value acquired in the calculating of the deviation can gradually approach the initial target value as an ideal value so as to be stabilized.

At this moment, a possibility that the value acquired in the calculating of the deviation overshoots the predetermined range can be decreased, compared to a case where the setting of the target value is not included.

As a result, a time during which the value acquired in the calculating of the deviation is within the predetermined range can be extended. In other words, the skew speed can be reduced and stabilized.

For example, a control process in which the value acquired in the calculating of the deviation by using so-called a PID control method that is known technology combining proportion, integration, and differentiation is controlled so as to approach the set target value set in the setting of the target value can be performed effectively.

According to a third aspect of the invention, in the second aspect, the positive value in the setting of the target value is a maximum value within the predetermined range, and the negative value is a minimum value within the predetermined range.

According to the third aspect of the invention, in addition to the same advantages as those of the second aspect, the positive value in the setting of the target value is a maximum value within the predetermined range, and the negative value is a minimum value within the predetermined range. Accordingly, a possibility that the value acquired in the calculating of the deviation overshoots the predetermined range can be reduced further, compared to a case where the setting of the target value is not included.

According to a fourth aspect of the invention, in the first aspect, determining whether the position of the endless belt is within an allowed range by using a width-direction position detecting sensor of the endless belt in a case where the value is determined to be within the predetermined range in the determining of whether the value is within the predetermined range is included. In addition, the maintaining of the angle of the skew correcting roller is performed in a case where the position of the endless belt is determined to be within the allowed range in the determining of whether the position of the endless belt is in the allowed range. In addition, the displacing of the angle of the skew correcting roller in which the angle of the skew correcting roller is displaced to a side on which the position of the endless belt is within the allowed range is performed in a case where the position of the endless belt is determined to be out of the allowed range.

According to the fourth aspect of the invention, in addition to the advantages of the first aspect, the determining of whether the position of the endless belt is in the allowed range is included. Accordingly, when the position of the endless belt is determined not to be within the allowed range, the displacing the roller angle in which the angel of the skew correcting roller is displaced to a side on which the position of the endless belt is within the allowed range can be performed. As a result, the position of the endless belt can be stabilized within the allowed range with high precision.

For example, this aspect can be effectively applied to a case where the endless belt skews at a slow skew speed. Then, when the endless belt transports a recording medium in the middle of a recording process in a recording apparatus, the recording precision in the width direction of the recording medium with respect to the transport direction can be improved.

According to a fifth aspect of the invention, there is provided a belt transportation device including: a driving roller that is driven by a power source; a driven roller that is held to be rotatable; an endless belt that is wound around the driving roller and the driven roller; a skew correcting roller that corrects skew of the endless belt by being brought into contact with a face of the endless belt; a skew speed detector that detects a skew speed of the endless belt in the width direction of the endless belt; and a control unit that calculates a difference between the skew speed acquired by the skew speed detector and an initial target value, determines whether the calculated value is within a predetermined range, and maintains the angle of the skew correcting roller in a case where the calculated value is determined to be within the predetermined range and displaces the angle of the skew correcting roller to a side on which the calculated value becomes closer to the initial target value in a case where the calculated value is determined to be out of the predetermined range.

According to the fifth aspect, the same advantages in the belt transportation device as those of the first aspect can be acquired.

According to a sixth aspect of the invention, there is provided a recording apparatus including: a transport unit that holds and transports a recording medium; and a recording unit that performs a recording operation for the transported recording medium. The transport unit is the belt transportation device according to the fifth aspect.

According to the sixth aspect of the invention, the transport unit is the belt transportation device according to the fifth aspect. Accordingly, the same advantages as those of the fifth aspect can be acquired in the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a belt skew correction device, a belt transportation device having the belt skew correction device, and a recording apparatus having the belt transportation device according to embodiments of the invention will be described. First, as a preferred embodiment for implementing the recording apparatus, an ink jet printer 100 in which a belt transportation device as a transport unit for a recording material (hereinafter, referred to as a paper sheet) P is mounted will be exemplified. The entire configuration of the ink jet printer 100 will now be described with reference to the accompanying drawings.

Figure 1:
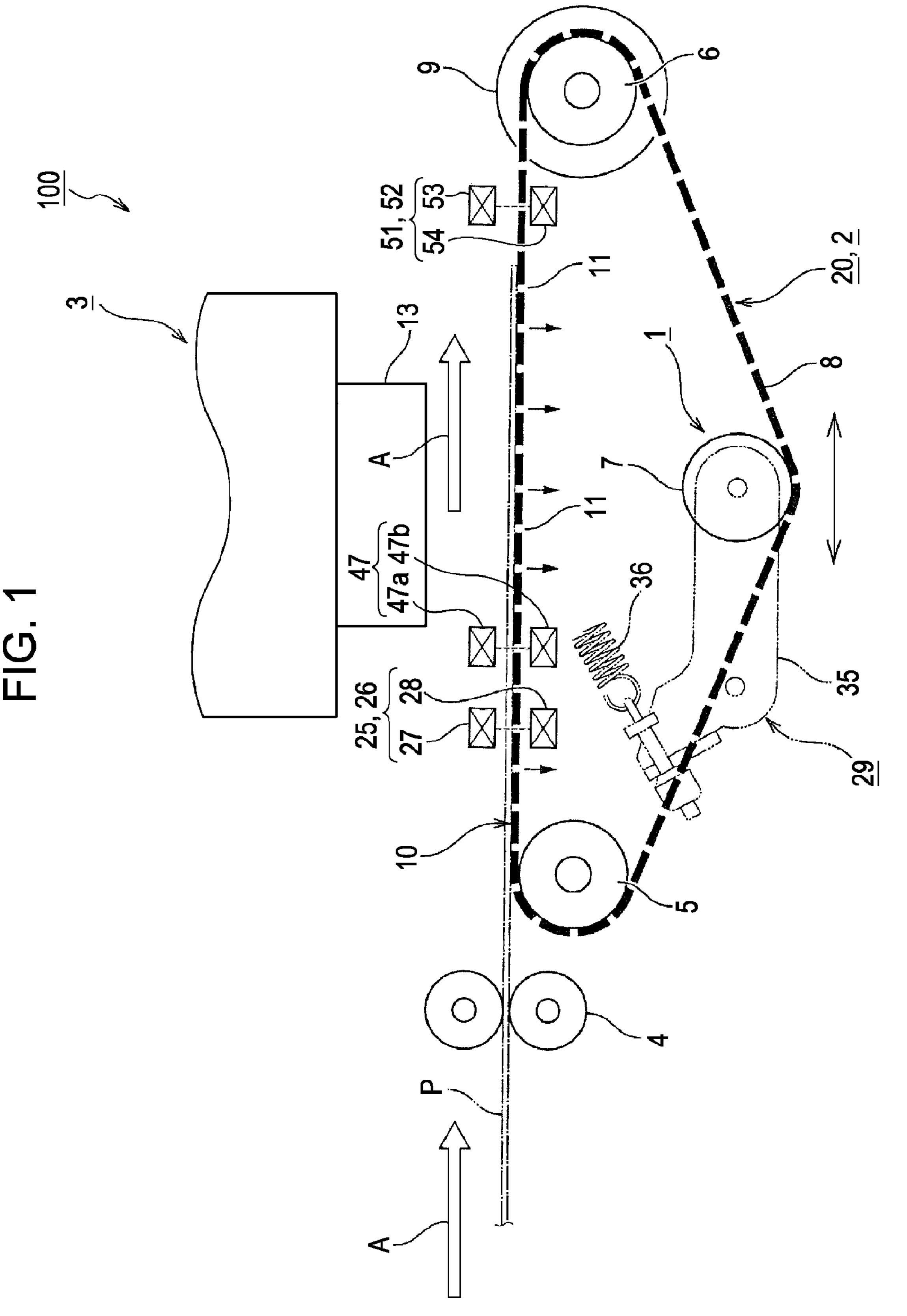
FIG. 1 is a side cross-sectional view showing a schematic internal structure of an ink jet printer including a belt transportation device according to an embodiment of the invention.
Figure 2:
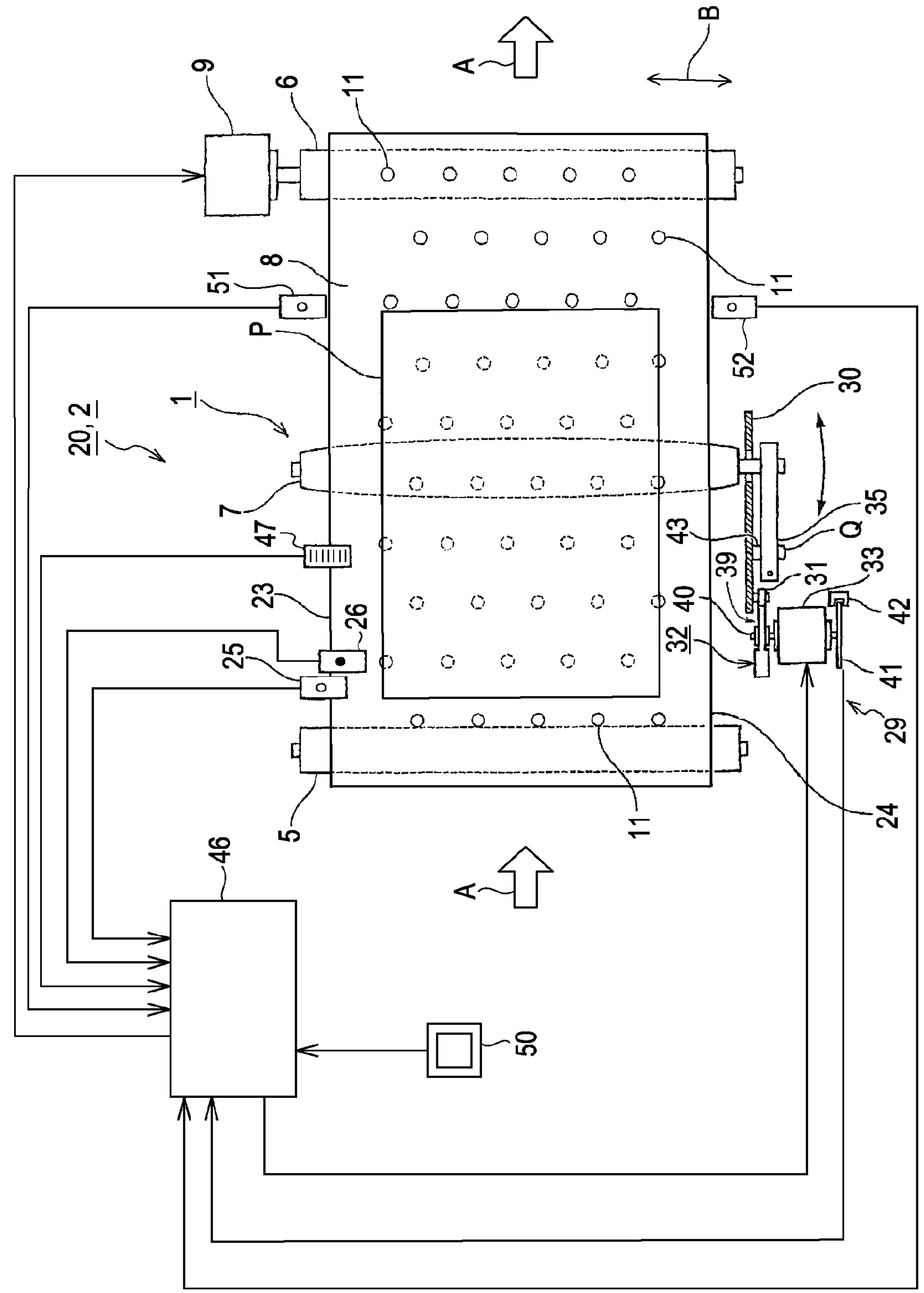
FIG. 2 is a plan view of a belt transportation device to which the belt skew correction device according to an embodiment of the invention is applied.
Figure 3A:
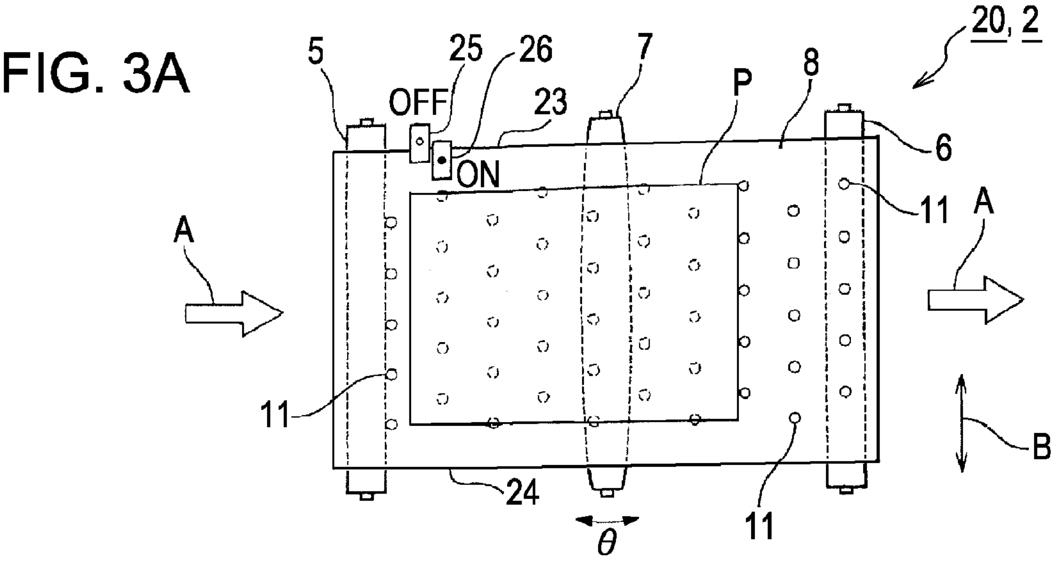
FIGS. 3A to 3C are plan views showing a normal case (FIG. 3A) of an endless belt, a left-side skewed case (FIG. 3B) of the endless belt, and a right-side skewed case (FIG. 3C) of the endless belt.
Figure 3B:
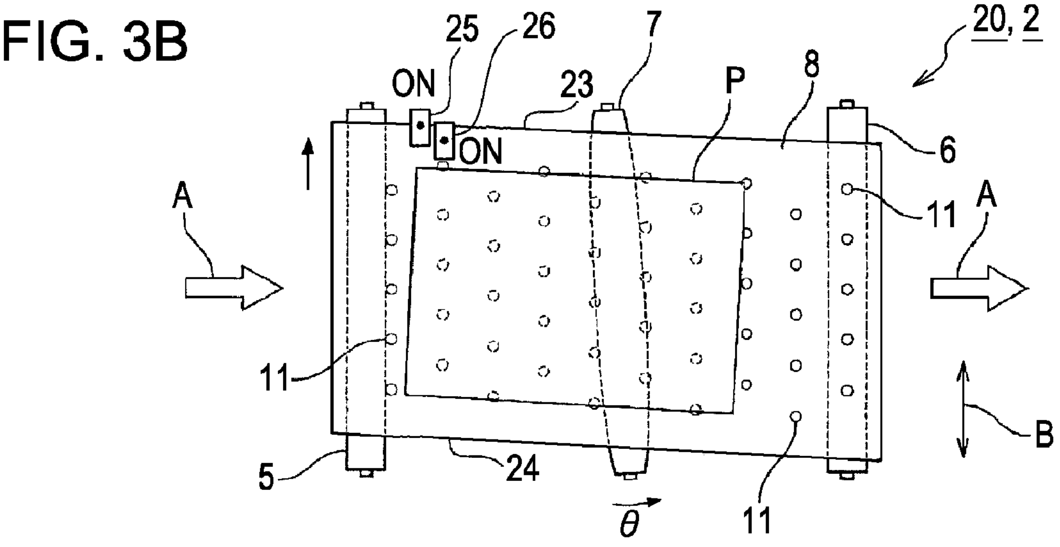
Figure 3C:
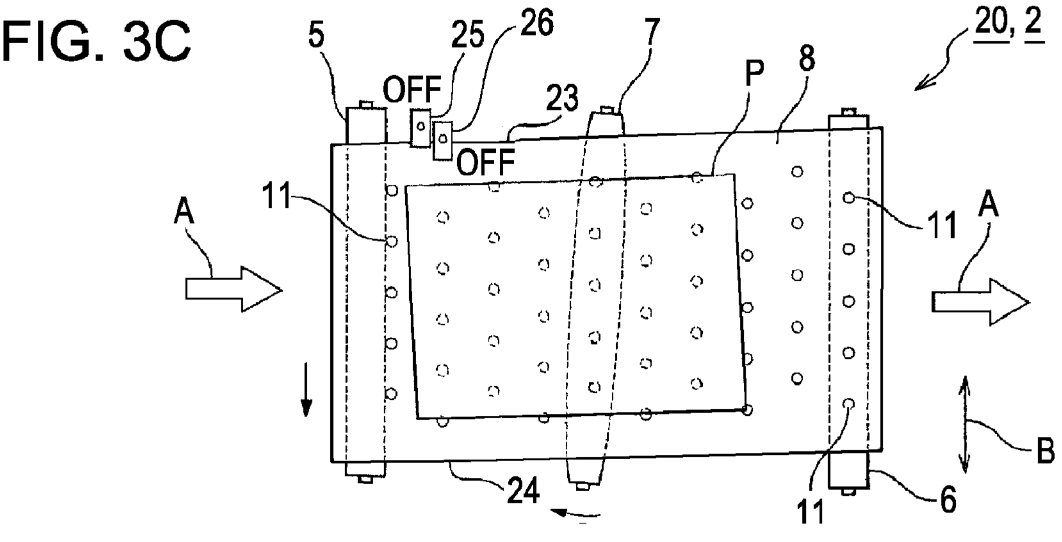

FIG. 1 is a side cross-sectional view showing a schematic internal structure of an ink jet printer including a belt transportation device in which a belt skew correction device according to an embodiment of the invention is used. FIG. 2 is a schematic plan view of a belt transportation device to which the belt skew correction device according to an embodiment of the invention is applied. In addition, FIGS. 3A to 3C are schematic plan views showing a normal case (FIG. 3A) of an endless belt, a left-side skewed case (FIG. 3B) of the endless belt, and a right-side skewed case (FIG. 3C) of the endless belt.

The ink jet printer 100 includes a printer main body, which is not shown in the figure, as an example of a recording apparatus main body. Inside the printer main body, a transport unit 2 that holds and transports a paper sheet P and a recording unit 3 that performs a recording operation for a recording sheet P that is held and transported by the transport unit 2 are disposed. As the transport unit 2 of the ink jet printer 100 shown in the figure, a belt transportation device 20 is used. Thus, a paper sheet P fed by a feed unit not shown in the figure is supplied to the belt transportation device 20 through a gate roller 4 that is configured by one pair of nip rollers.

In the belt transportation device 20, a driven roller 5 is disposed on the upstream side in the transport direction A, a driving roller 6 is disposed on the downstream side in the transport direction A, and a belt skew correcting roller 7 that is a constituent member of the belt skew correction device 1 according to an embodiment of the invention, to be described later, is disposed below a position located between the driven roller 5 and the driving roller 6. The belt transportation device 20 is basically configured by winding an endless belt 8 around three rollers 5, 6, and 7 in the shape of a loop.

The driven roller 5 and the driving roller 6 are members having a straight pipe shape or a round bar shape and have a constant-diameter and a same shape in the axis direction B. Between these, the driving roller 6 is a roller that applies a transport force to the endless belt 8 in the transport direction A. To one end of the driving roller 6 in the axis direction B, for example, a transport driving motor 9 that transfers power to the driving roller 6 is directly connected. On the other hand, the driven roller 5 is disposed at a same height as that of the driving roller 6 and is disposed to be faced with the driving roller 6 with a predetermined distance interposed therebetween and to be parallel to the driving roller 6. Between the driving roller 6 and the driven roller 5, a transport face 10 of a paper sheet P that is formed by tightly extending the endless belt 8 horizontally is formed.

The endless belt 8 is a member formed of a material such as synthetic rubber or a resin film that has elasticity and having an endless band shape. In the endless belt 8, a plurality of air holes 11, 11, . . . as shown in the figure is formed. Through the air holes 11, an operation for adsorbing and holding a paper sheet P is performed by an adsorption device not shown in the figure, and whereby the paper sheet P is adsorbed and held on the transport face 10 of the endless belt 8.

As an adsorption method used in the adsorption device, for example, a suction method by using negative pressure or an electrostatic adsorption method may be employed. In addition, the recording unit 3 has a record head 13 that performs a recording operation by injecting ink of colors on the upper face of the paper sheet P as a major constituent member thereof.

Embodiment

Next, the belt skew correction device 1 according to an embodiment of the invention that is used in the belt transportation device 20 built in the ink jet printer 100 configured as described above will be described in detail with reference to the accompanying drawings.

Figure 4:
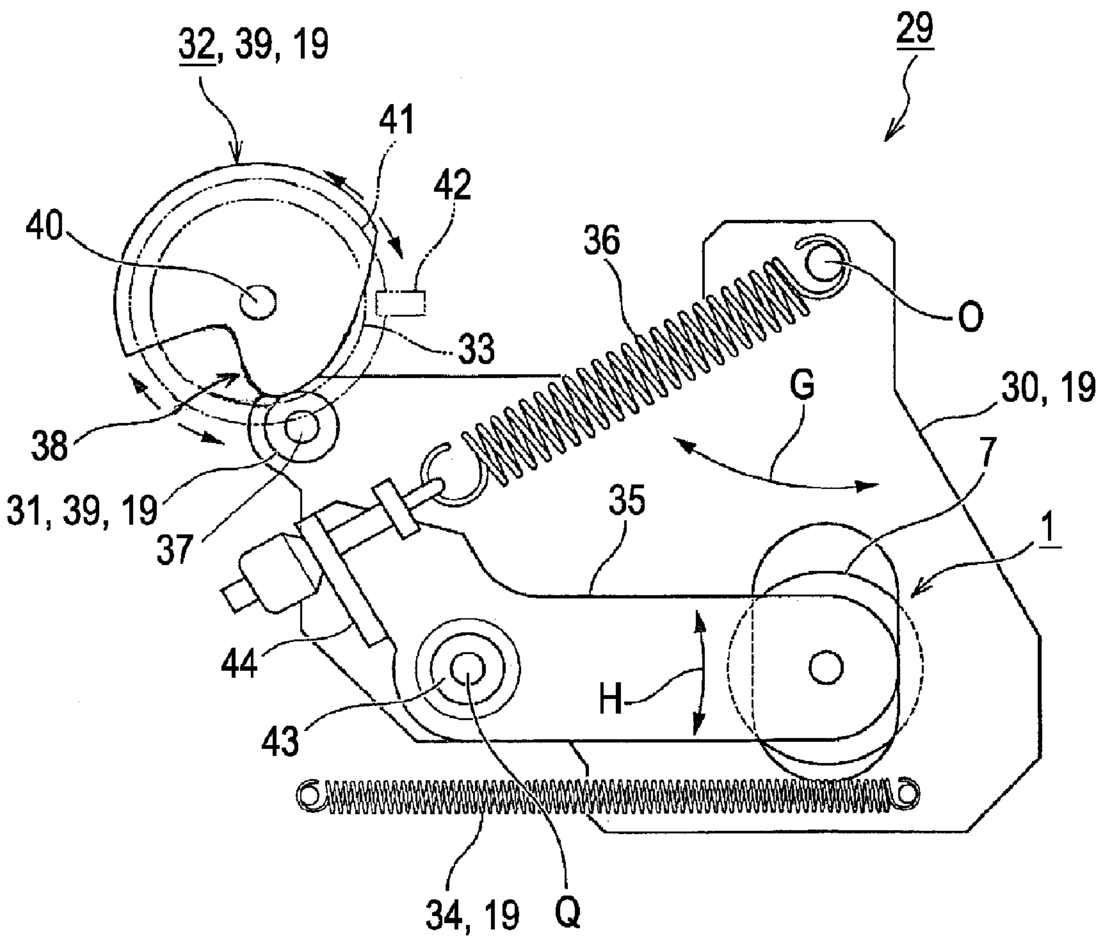
FIG. 4 is a side cross-sectional view showing an inclination mechanism according to an embodiment of the invention.

FIG. 4 is a side cross-sectional view showing an inclination mechanism of the belt skew correction device according to an embodiment of the invention. FIGS. 5A to 5D are front views showing various shapes of the belt skew correcting rollers of the belt skew correction device according to an embodiment of the invention.

Figure 6:
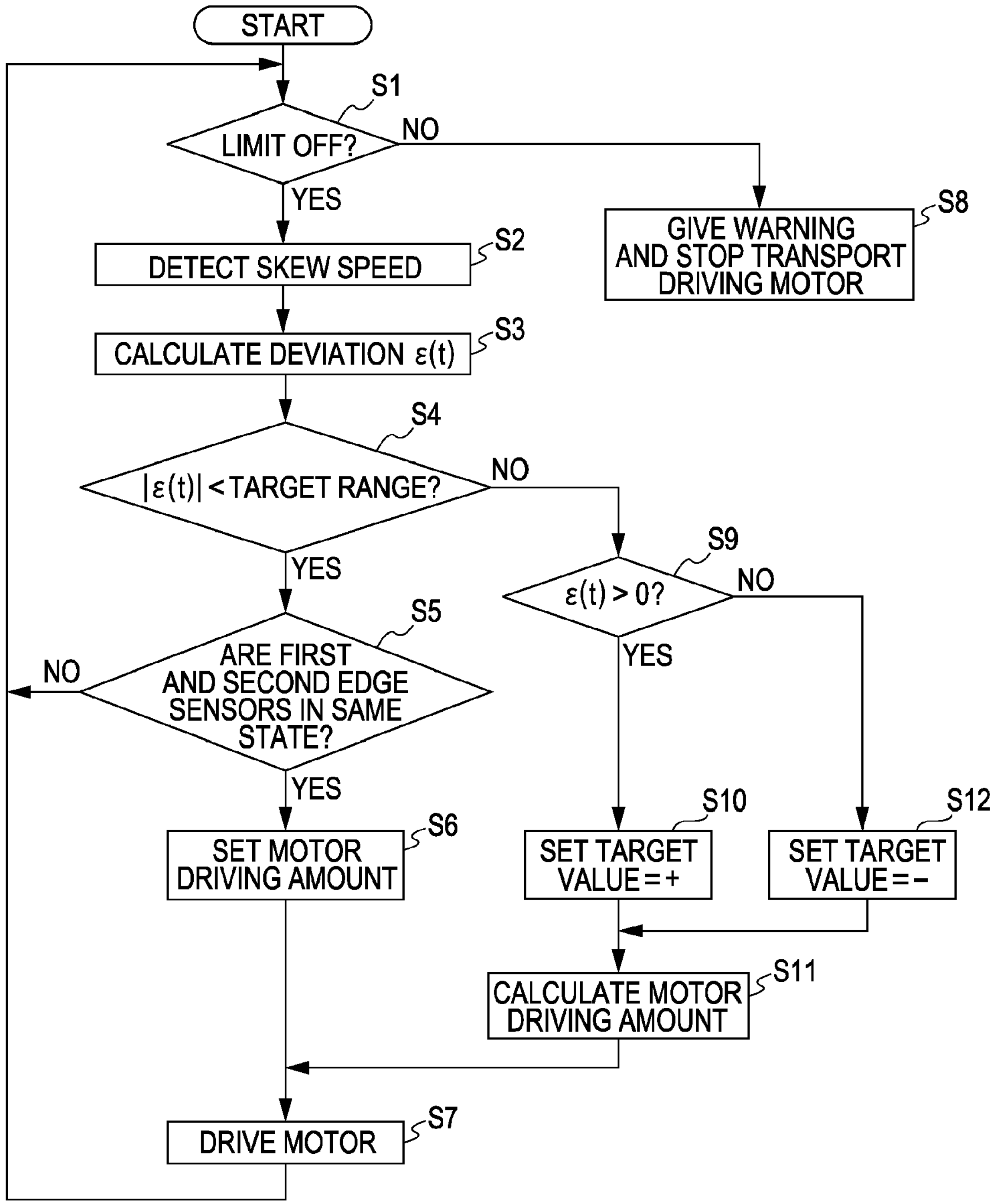
FIG. 6 is a flowchart showing an example of a skew correcting control process for the endless belt.
Figure 7:
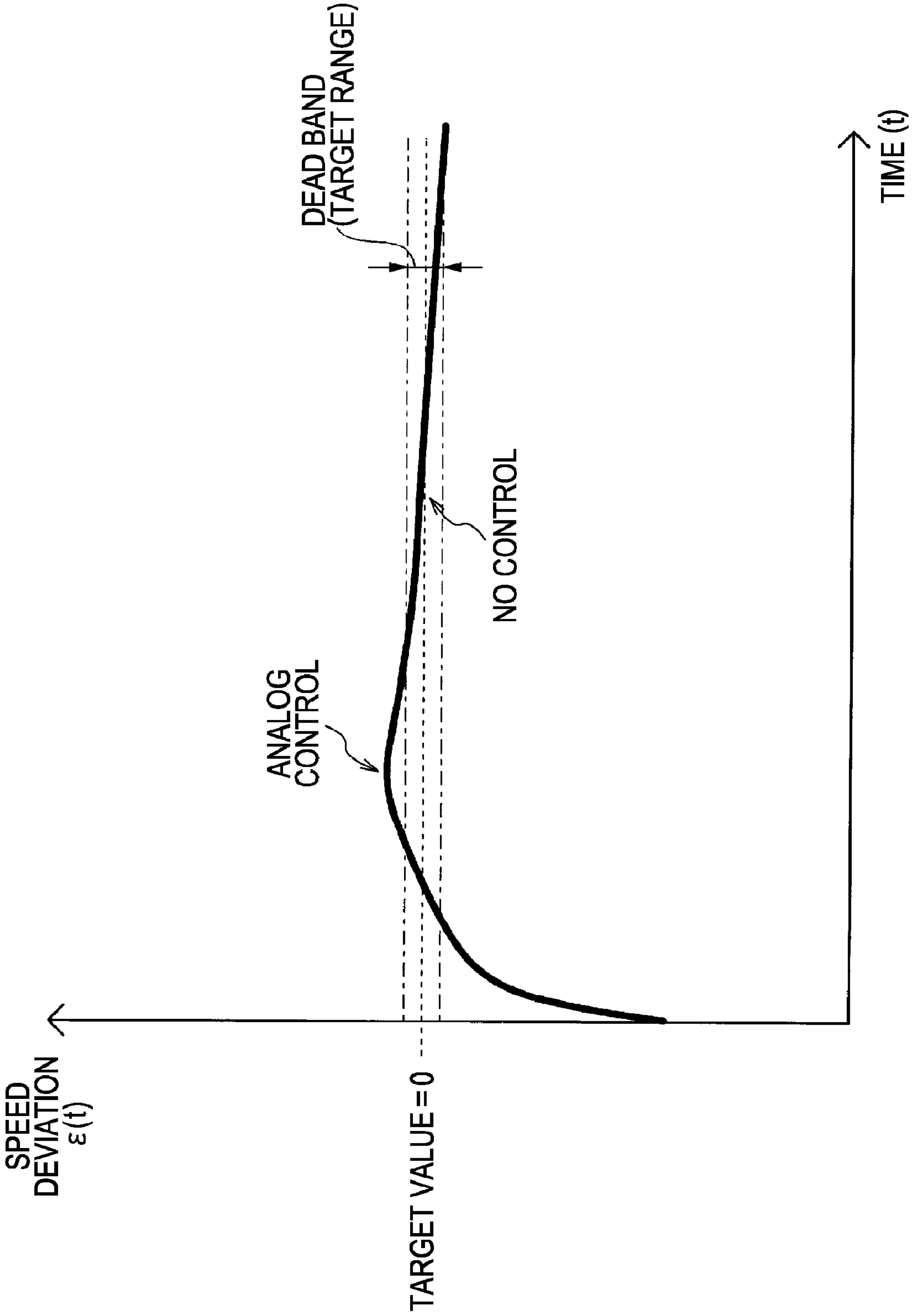
FIG. 7 is a diagram showing the effect of the skew correcting control process according to an embodiment of the invention.
Figure 8:
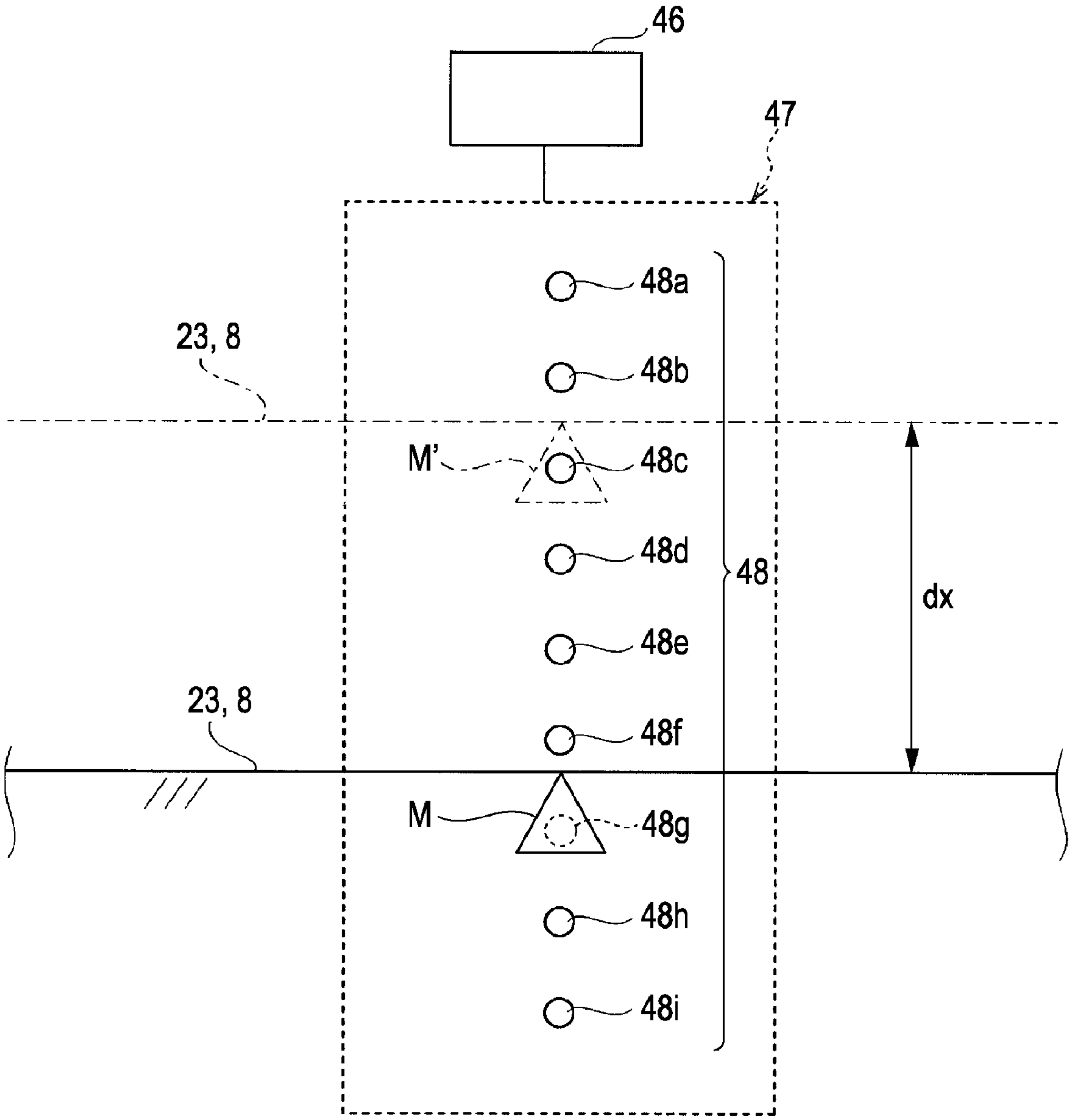
FIG. 8 is a schematic diagram showing the principle of a skew speed sensor according to an embodiment of the invention.

FIG. 6 is a flowchart showing an example of a skew correcting control process for the endless belt. In addition, FIG. 7 is a diagram showing the effect of the skew correcting control process according to an embodiment of the invention. FIG. 8 is a schematic diagram showing the principle of a skew speed sensor according to an embodiment of the invention.

The belt skew correction device 1 according to this embodiment includes a belt skew correcting roller 7 that corrects skew of the endless belt 8 by being brought into contact with the rear face of the endless belt 8 that is wound between the driving roller 6 and the driven roller 5. The belt skew correcting roller 7, as shown in FIGS. 5A to 5D, is a variable-diameter roller in which the roller diameter of the center part is larger than that of each of two end parts. According to this embodiment, in a case where the roller diameter of the center part is denoted by D, and the roller diameter of each end part is denoted by d, D−d=about 0.3 mm. Thus, the roller diameter D of the center part is set to be larger than the roller diameter d of the end part.

Figure 5A:
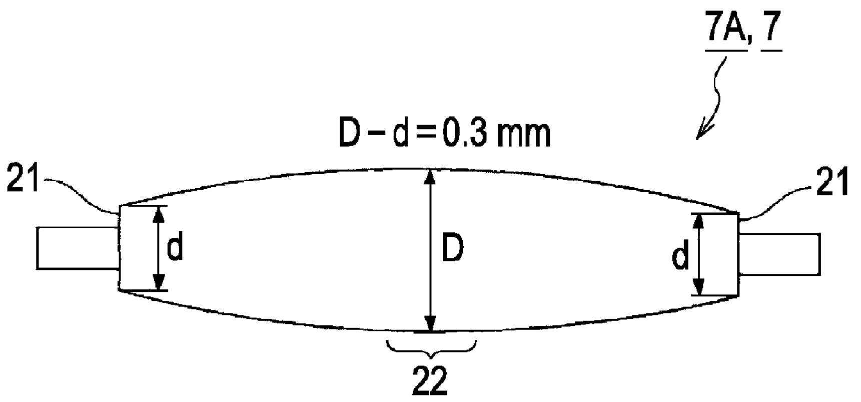
FIGS. 5A to 5D are front views showing various shapes of belt skew correcting rollers according to an embodiment of the invention.
Figure 5B:
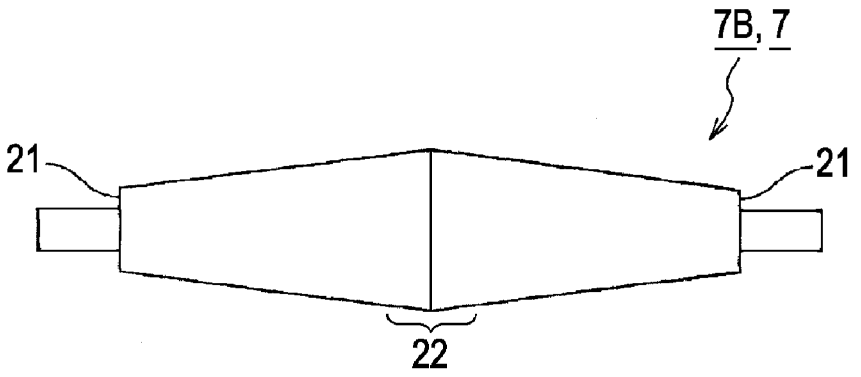

In FIGS. 5A and 5B, belt skew correcting rollers 7A and 7B that are formed to have the roller diameters to be changed continuously in the entire length are shown. The belt skew correcting roller 7A shown in FIG. 5A has small diameter portions 21 and 21 in both ends thereof and has a large diameter portion 22 in the center part. Thus, the belt skew correcting roller 7A is formed as a variable-diameter roller of which an outer surface is a convex-curved surface from the left and right small diameter portions 21 and 21 to the center large diameter portion 22. In other words, the belt skew correcting roller 7A is formed in a so-called crown shape. On the other hand, the belt skew correcting roller 7B shown in FIG. 5B also has small diameter portions 21 and 21 in both ends and has a large diameter portion 22 in the center part. Thus, the belt skew correcting roller 7B is formed such that the roller diameter is linearly increased from the left and right small diameter portions 21 and 21 to the center large diameter portion 22.

Figure 5C:
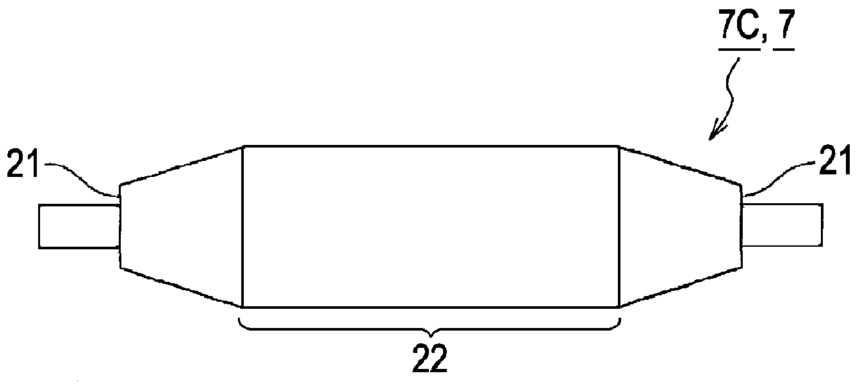
Figure 5D:
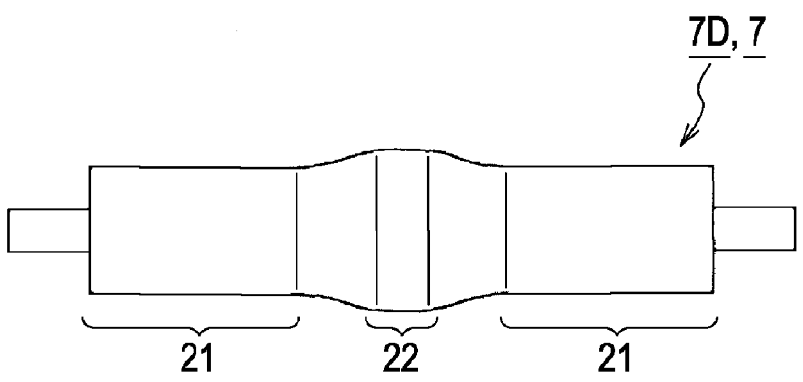

In addition, in FIGS. 5C and 5D, belt skew correcting rollers 7C and 7D that are formed to have roller diameters changed over a partial range in the axis direction are shown. Between these, the belt skew correcting roller 7C shown in FIG. 5C is a variable-diameter roller having a large range of a large diameter portion 22 with corner parts on both ends rounded off. On the other, the belt skew correcting roller 7D shown in FIG. 5D is a variable-diameter roller having a large range of small diameter portions 21 and 21 with only the center part raised.

By using the belt skew correcting roller 7 of such a shape, slip of the endless belt 8 over the belt skew correcting roller 7 can be suppressed, and accordingly, a force of the belt skew correcting roller 7 for correcting the skew of the endless belt 8 is transferred to the endless belt 8 at high efficiency. In addition, by using the belt skew correcting roller 7 of the above-described shape, a force for stopping by the center is generated in the endless belt 8. Accordingly, occurrence of skew of the endless belt 8 is suppressed, and generation of wrinkles of the endless belt 8 is prevented.

In addition, as shown in FIG. 2, in the belt skew correction device 1, two On/Off switch-type edge sensors of a first edge sensor 25 and a second edge sensor 26 each detecting the edge position of only one edge 23 between left and right edges 23 and 24 in the belt width direction (coincides with the axis direction B) of the endless belt 8 are disposed, in addition to the belt skew correcting roller 7. In a normal state shown in FIG. 3A, the first edge sensor 25 is in the OFF state, and the second edge sensor 26 is in the ON state.

When the endless belt 8 is skewed to the left side as shown in FIG. 3B, the first edge sensor 25 and the second edge sensor 26 are set to be in the ON state. On the other hand, when the endless belt 8 is skewed to the right side as shown in FIG. 3C, the first edge sensor 25 and the second edge sensor 26 are set to be in the OFF state. As the first and second edge sensors 25 and 26, non-contact type sensors such as optical sensors each including a light emitting part 27 and a light receiving part 28 are used as an example.

Here, when edge sensors are disposed in the edges 23 and 24 on both sides, a tolerance that is a variation due to shapes of the edges 23 and 24 on both sides is needed to be considered.

Thus, by disposing the first edge sensor 25 and the second edge sensor 26 only in one edge side, the tolerance to be considered can be decreased by half. In other words, in such a case, detection precision of the position of the endless belt 8 in the width direction can be improved.

In addition, as shown in FIG. 2, in the belt skew correction device 1, two limit sensors including a left limit sensor 51 and a right limit sensor 52 of an On/Off switch-type that detect the edge positions of the left and right edges 23 and 24 in the belt width direction (that coincides with the axis direction B) of the endless belt 8 are disposed, in addition to the first edge sensor 25 and the second edge sensor 26.

When the position of the endless belt 8 is within the allowed range, the left limit sensor 51 and the right limit sensor 52 are set to be in the OFF state. On the other hand, when the position of the endless belt 8 is out of the allowed range, the left limit sensor 51 and the right limit sensor 52 are set to be in the ON state. When at least one between the left limit sensor 51 and the right limit sensor 52 is in the ON state, the belt skew correction device 1 is configured to stop driving the driving roller 6.

In other words, when the inclination and the position of the endless belt 8 become out of the allowed range for any reason, the left limit sensor 51 and the right limit sensor 52 can accomplish a role of so-called a safety device to stop driving of the driving roller 6. As a result, dropout of the endless belt 8 can be prevented.

As the left limit sensor 51 and the right limit sensor 52, non-contact type sensors such as optical sensors each including a light emitting part 53 and a light receiving part 54 are used as an example. It is apparent that a contact-type sensor may be used as the left and right limit sensors 51 and 52.

In addition, as shown in FIG. 2, in the belt skew correction device 1, a skew speed sensor 47 that calculates the skew speed of the endless belt 8 is disposed.

As shown in FIG. 8, the skew speed sensor 47 includes a light emitting part 47*a* and a light receiving part 47*b*. Between these, on the light receiving part side, a plurality of slits 48*a*, 48*b*, . . . (48) is disposed. It is configured that a mark M can be recognized through the slit 48*a*, 48*b*, . . . (48) in a case where the mark M posted in the endless belt 8 is located in a position for facing the slits 48*a*, 48*b*, . . . (48). In other words, the position of the endless belt 8 in the width direction can be recognized by determining through which slit 48*a*, 48*b*, . . . (48) among the plurality of slits 48*a*, 48*b*, . . . (48) the mark M is recognized.

Then, when the endless belt 8 rotates further, a control device 46 can acquire a distance dx between a slit (for example, 48*g*) through which the mark M is recognized at this time and a silt (for example, 48*c*) through which the mark M' has been recognized at the previous time.

In addition, the control device 46 can acquire a time dt from when the mark M' is recognized through a slit (for example, 48*c*) at the previous time to when the mark M is recognized through a slit (for example, 48*g*) at this time.

Accordingly, the skew speed can be calculated by using an equation of "Vx (skew speed)=dx (moving distance in the width direction)/dt (time)".

In addition, since the skew speed sensor 47 can detect the position of the endless belt 8 in the width direction, the first edge sensor 25, the second edge sensor 26, the left limit sensor 51, and the right limit sensor 52 that are described above can be omitted.

Moreover, as shown in FIG. 2, in the belt skew correction device 1, an inclination mechanism 29 that inclines the belt skew correcting roller 7 in a direction for correcting the skew of the endless belt 8 is disposed. The inclination mechanism 29 includes a cam operating motor 33 that is a driving body as a power source and a conversion mechanism 19 that includes relationship in which the amount of inclination of the belt skew correcting roller 7 is determined in correspondence with the amount of rotation driving of the cam operating motor 33 and converts the rotation driving of the cam operating motor 33 into inclination of the belt skew correcting roller 7. The conversion mechanism 19 is configured by a roller supporting frame 30, a cam follower 31 configuring a cam mechanism 39, an inclination cam 32 configuring the cam mechanism 39, and a biasing unit 34.

In addition, on a rotation shaft 40 of the inclination cam 32, a detection plate 41, for example, in which a plurality of silts is formed in a radial pattern is disposed for setting the rotation angle of the inclination cam 32. The rotation amount of the detection plate 41 can be detected by a cam position sensor 42 disposed nearby. The detection plate 41 and the cam position sensor 42 may not be disposed.

Furthermore, according to this embodiment, in order to use the belt skew correcting roller 7 also as a tension roller, an oscillating arm 35 and a tension spring 36 are included.

The roller supporting frame 30 is a supporting member that supports the belt skew correcting roller 7 to be rotatable and performs predetermined angular rotation as denoted by arrow G shown in FIG. 4 with a fulcrum point O of rotation, which is disposed on the upper right part of FIG. 4, used as the center. In addition, in the upper left part of the free end side of rotation of the roller supporting frame 30, a shaft part 37 is disposed to be erected, and the cam follower 31 having a small-diameter circular plate shape is disposed to be rotatable about the shaft part 37.

In addition, in the cam follower 31, the inclination cam 32 that transfers driving to the roller supporting frame 30 is disposed in a state in which the inclination cam 32 is brought into contact with the cam follower 31 all the time. The inclination cam 32 has a cam face 38 that is formed to slowly change the cam height on a part of the peripheral face, and the inclination angle θ of the belt skew correcting roller 7 can be adjusted by changing the contact position of the cam face 38 that is brought into contact with the peripheral face of the cam follower 31.

In other words, in the belt skew correction device 1 according to this embodiment, the inclination mechanism 29 includes the cam operating motor 33 that is driven intermittently by a unit drive amount and the conversion mechanism 19 that has the relationship in which the inclination amount of the belt skew correcting roller 7 is determined in correspondence with the drive amount of rotation of the cam operating motor 33 and converts driving of the cam operating motor 33 into inclination of the belt skew correcting roller 7.

In addition, the biasing unit 34 is a member that biases the roller supporting frame 30 so as to bringing the cam follower 31 into contact with the inclination cam 32 all the time. The biasing unit 34, for example, is configured by a tension coil spring. In addition, one end of the biasing unit 34 is locked with a lower right part of the roller supporting frame 30 in FIG. 4, and the other end of the biasing unit 34 is locked with an appropriate fixed frame of the printer main body that is not shown in the figure.

In a lower left part of the roller supporting frame 30 in FIG. 4, a shaft part 43 is disposed to be erected and the oscillating arm 35 is disposed in a state for oscillating in the tightening direction and the loosening direction denoted by arrow H shown in FIG. 4 with the shaft part 43 used as a fulcrum point Q. In addition, between a base end part 44 of the oscillating arm 35 located on the upper left part of FIG. 4 and the fulcrum point O of rotation of the roller supporting frame 30 with the fulcrum point Q of oscillation interposed therebetween, the above-described tension spring 36 that is, for example, configured by a tension coil spring is stretched.

Furthermore, the belt skew correction device 1 includes the control device 46 that performs a skew correcting control operation for the endless belt 8 by driving the cam operating motor 33 by the calculated amount of driving in a case where any one (for example 25) of the edge sensors detects the ON state.

Description of Skew Correcting Operation

Next, a detailed skew correcting operation performed by the control device 46 will be described with reference to FIGS. 3, 6, and 7.

First, when a start switch 50 (FIG. 2) is pushed down, the transport driving motor 9 is driven, and a transport operation for the endless belt 8 is started. In addition, simultaneously with the above-described operation, the process proceeds to a state in which one edge 23 of the endless belt 8 can be detected by the first sensor 25 and the second sensor 26.

Then, in Step S1 shown in FIG. 6, it is determined whether the limit sensors are in the OFF state. In particular, it is determined whether at least one between the left limit sensor 51 and the right limit sensor 52 is in the OFF state. Here, when both limit sensors are not in the OFF state, that is, when any one of the limit sensors is in the ON state, there is a possibility that the endless belt runs off or is brought into contact with other members. When both limit sensors are determined to be in the OFF state, the process proceeds to Step S2. On the other hand, when both limit sensors are determined not to be in the OFF state, the process proceeds to Step S8.

In Step S2, the skew speed is detected. In particular, as described above, the positions of the mark M of the endless belt 8 at this time and the previous time are recognized by using the skew speed sensor 47, and thereby the skew speed is calculated based on a difference between the positions of the mark M. Then, the process proceeds to Step S3.

In Step S3, a deviation is calculated. In particular, a difference between the value of the skew speed that is calculated in Step S2 and a reference target value of "0" is calculated. Then, the process proceeds to Step S4.

In Step S4, it is determined whether the absolute value of the deviation value that is calculated in Step S3 is smaller than a target range. In other words, it is determined whether the absolute value of the deviation value is within the target range.

Here, a method of setting the target range will be described. For example, in a case where up to ±10 μm in the width direction is allowed during a period in which one paper sheet P of an A2 size is sent at the transport speed of 254 mm/s, the target range is about ±9 μm/s.

Then, when the absolute value is determined to be within the target range, the process proceeds to Step S5. On the other hand, when the absolute value is determined not to be within the target range, the process proceeds to Step S9.

In Step S5, it is determined whether the first edge sensor 25 and the second edge sensor 26 are in a same state. In particular, it is determined whether both the first edge sensor 25 and the second edge sensor 26 are in the ON state or in the OFF state.

Here, when both the edge sensors are in the ON state, the left-side skew shown in FIG. 3B can be determined. On the other hand, when both the edge sensors are in the OFF state, the right-side skew shown in FIG. 3C can be determined.

On the other hand, when it is determined that the first edge sensor 25 and the second edge sensor 26 are not in a same state, the process proceeds back to Step S1. By looping through Steps S1, S2, S3, S4, and S5, a steering control process for the belt skew correcting roller 7 may not be performed. This is referred to as a "dead band" (see FIG. 7). Accordingly, vibration or speed variation of the endless belt 8 can be suppressed by not driving the driving units such as the cam operating motor 33. As a result, the recording precision for a paper sheet P can be improved.

On the other hand, when the edge sensors 25 and 26 are in a same state, the process proceeds to Step S6.

In Step S6, the motor driving amount is set. In particular, in order to incline the belt skew correcting roller 7 to a side on which the position of the endless belt 8 returns to the center in FIG. 3A, a predetermined driving amount for the cam operating motor 33 is set. Then, the process proceeds to Step S7.

Here, since the edge sensors 25 and 26 can detect the position, the driving amount for the cam operating motor 33 may be calculated and set by using known technology that is so-called a PID control process based on a deviation between the position of the endless belt 8 and the target position, like the skew speed to be described later in Step S11.

In Step S7, a motor driving operation is performed. In particular, the cam operating motor 33 is driven based on the driving amount that is set in Step S6 or Step S11 to be described later. Then, the process proceeds back to Step S1.

In Step S8, a warning operation and a stop operation are performed. In particular, the transport driving motor 9 is stopped. Then, a warning that urges a user to check the position of the endless belt 8 is made. The warning operation may be performed by generating a warning sound, a warning voice or displaying a warning statement in a liquid crystal display unit or the like.

In Step S9, it is determined whether the deviation value calculated in Step S3 is positive or negative. When the deviation value is determined to be positive, the process proceeds to Step S10. On the other hand, when the deviation value is determined not to be positive, that is, negative, the process proceeds to Step S12.

In Step S10, the target value is set on the "+" (positive) side (hereinafter, a target value that is set is referred to as a set target value). In particular, the target value is set to the positive side (for example, 0 to 9 μm/s) of the target range shown in FIG. 7.

Here, it is preferable that the set target value is 9 μm/s that is the upper limit (maximum value). In such a case, an occurrence of a case where the speed deviation thereafter overshoots the lower limit (−9 μm/s) of the target range can be minimized. In addition, the speed deviation can be stabilized near the reference target value of "0", and accordingly, a time for staying in the dead band can be extended.

Then, the process proceeds to Step S11.

In Step S11, the motor driving amount is calculated. In particular, when the set target value is 9 μm/s, the driving amount for the cam operating motor 33 is calculated such that the belt skew correcting roller 7 is inclined in a direction in which the speed deviation shown in FIG. 7 becomes closer to the set target value of 9 μm/s by using a PID control process as known technology.

On the other hand, when the set target value is −9 μm/s, the driving amount for the cam operating motor 33 is calculated such that the belt skew correcting roller 7 is inclined in a direction in which the speed deviation shown in FIG. 7 becomes closer to the set target value of −9 μm/s by using the PID control process.

Here, the driving amount for the cam operating motor 33 may be a predetermined defined amount.

Then, the process proceeds to Step S7.

In Step S12, the target value is set on the "−" (negative) side. In particular, the target value is set to the negative side (for example, −9 to 0 to μm/s) of the target range shown in FIG. 7.

Here, it is preferable that the set target value is −9 μm/s that is the lower limit (minimum value) of the negative side. In such a case, an occurrence of a case where the speed deviation thereafter overshoots the upper limit (9 μm/s) of the target range can be minimized. In addition, the speed deviation can be stabilized near the reference target value of "0", and accordingly, a time for staying in the dead band can be extended.

Then, the process proceeds to Step S11.

The belt skew correction controlling method according to this embodiment includes a skew speed detecting process (S2) for detecting the skew speed Vx of the wound endless belt 8, a deviation calculating process (S3) for calculating a difference between the skew speed acquired in the skew speed detecting process (S2) and an initial target value of "0", a predetermined range determining process (S4) for determining whether a value acquired in the deviation calculating process (S3) is within a predetermined range, a roller angle maintaining process (loop of S1 to S5) for maintaining the angle of the belt skew correcting roller 7 as a skew correcting roller that is wound by the endless belt 8 and can be inclined for a case where the value is determined to be within the predetermined range in the predetermined range determining process (S4), and a roller angle displacing process (S7 and S11) for displacing the angle of the belt skew correcting roller 7 to a side on which the value acquired in the deviation calculating process (S3) becomes closer to the initial target value of "0" for a case where the value is determined not to be within the predetermined range in the predetermined range determining process (S4).

In addition, according to this embodiment, in a case where the value is determined not to be within the predetermined range in the predetermined range determining process (S4), a positive-negative determining process (S9) for determining whether the value acquired in the deviation calculation process (S3) is positive or negative and a target value setting process (S10 and S12) for setting the target value as a positive value in the predetermined range for a case where the value is determined to be positive in the positive-negative determining process (S9) and for setting the target value as a negative value in the predetermined range for a case where the value is determined to be negative are included further. In the roller angle displacing process (S7), the angle of the belt skew correcting roller 7 is displaced such that the value acquired in the deviation calculating process (S3) approaches the set target value that is set in the target value setting process (S10 and S12).

In addition, according to this embodiment, the positive value in the target value setting process (S10 and S12) is a maximum value within the predetermined range, and the negative value is a minimum value within the predetermined range.

In addition, in this embodiment, a width-direction belt position determining process (S5) for determining whether the position of the endless belt 8 is within an allowed range by using a width-direction position detecting sensor of the endless belt 8 is included further for a case where the value is determined to be within the predetermined range in the predetermined range determining process (S4). Then, the roller angle maintaining process is performed for a case where the position of the endless belt 8 is determined to be within the allowed range in the width-direction belt position determining process (S5) and the roller angle displacing process (S6 and S7) for displacing the angle of the belt skew correcting roller 7 to a side on which the position of the endless belt 8 becomes within the allowed range is performed for a case where the position of the endless belt 8 is determined not to be within the allowed range.

A belt transportation device 20 according to this embodiment includes a driving roller 6 that is driven by a transport driving motor 9 as an example of a power source, a driven roller 5 that is held to be rotatable, and an endless belt 8 that is wound around the driving roller 6 and the driven roller 5, a belt skew correcting roller 7 that corrects the skew of the endless belt 8 by being brought into contact with a face of the endless belt 8, a skew speed sensor 47 as a skew speed detector that calculates the skew speed by detecting the position of the endless belt 8 in the width direction of the endless belt 8 (S2), and a control device 46 as a control unit that calculates a difference between the skew speed acquired by the skew speed sensor 47 and an initial target value of "0" (S3), determines whether the calculated value is within the predetermined range (S4) maintains the angle of the belt skew correcting roller 7 for a case where the calculated value is determined to be within the predetermined range, and displaces the angle of the belt skew correcting roller 7 to a side on which the calculated value becomes closer to the initial target value of “0” for a case where the calculated value is determined not to be within the predetermined range (S7 and S11).

A recording apparatus 100 according to this embodiment includes a transport unit 2 as a transport member that holds and transports a paper sheet P as an example of a recording medium and a recording unit 3 that performs a recording operation for the transported paper sheet P, wherein the transport unit 2 is the belt transport device 20.

Another Embodiment 1

Figure 9:
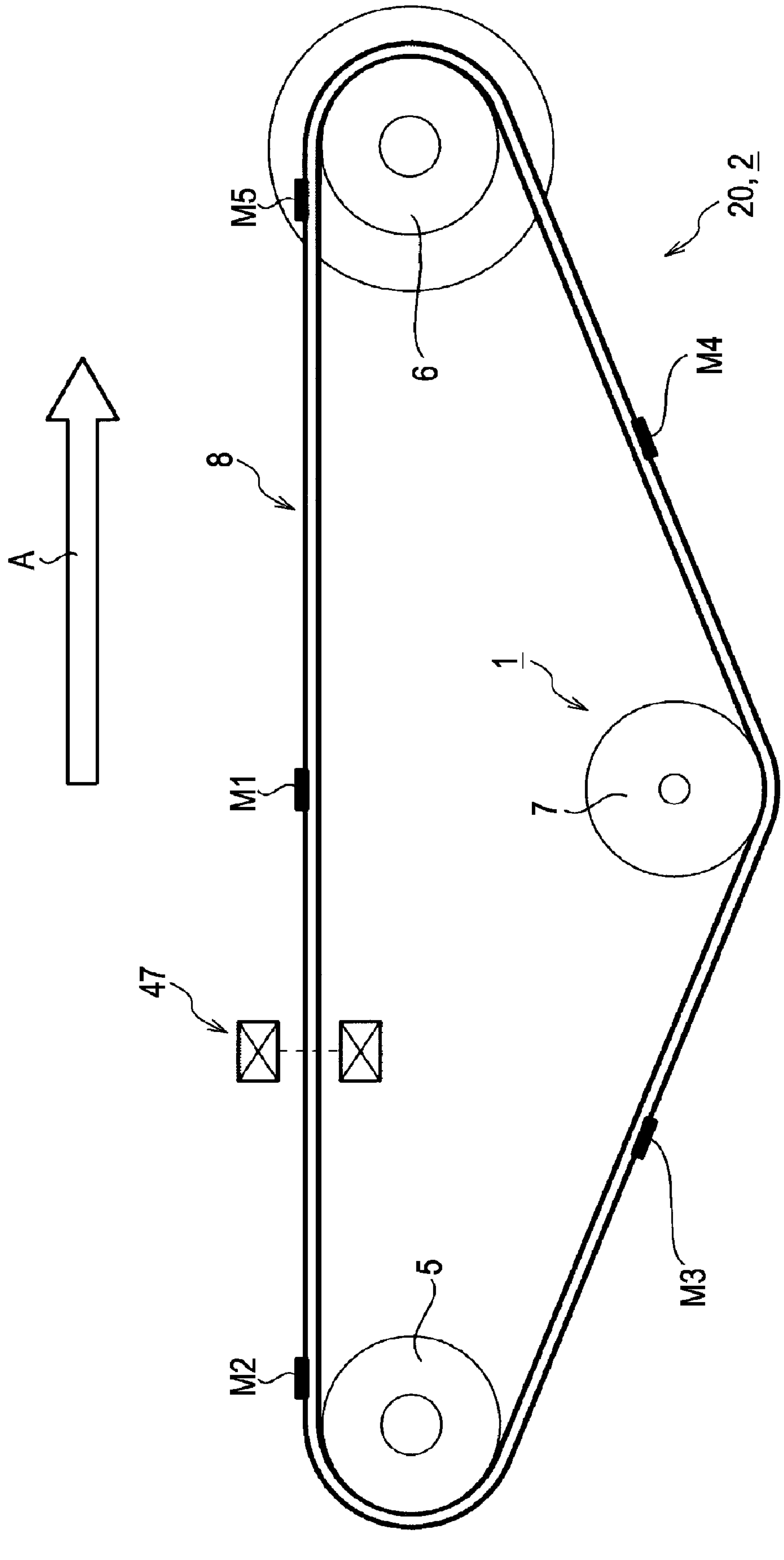
FIG. 9 is a schematic side view showing sampling points according to Another Embodiment 1.

FIG. 9 is a schematic side view showing sampling points according to Another Embodiment 1. This embodiment is the same as the above-described embodiment except for a first mark to a fifth mark to be particularly described. Thus, a same reference sign is used for corresponding constituent elements, and a duplicate description thereof is omitted here.

As shown in FIG. 9, in positions acquired from performing an n-dividing (for example, n=5 divisions) operation for one cycle of the endless belt, a first mark M1 to a fifth mark M5 are disposed. Then, skew speed sensors 47 recognize the first mark M1 to the fifth mark M5, and whereby the skew speeds are calculated, respectively.

In particular, a difference dx between the position of the first mark M1 recognized at the previous time and the position of the first mark M1 recognized at this time can be calculated as in the above-described embodiment. Then, the skew speed in the first mark M1 can be calculated. Similarly, the skew speeds in the second mark M2, the third mark M3, . . . can be calculated.

For example, when there is only one mark M as a sampling point and a time for the endless belt 8 to travel one cycle is long (for example, 20 seconds), the number of times for sampling in a predetermined time may not be sufficient. In such a case, the endless belt 8 may run off before the next sampling, or the left limit sensor 51 and the right limit sensor 52 may be operated.

Thus, one cycle of the endless belt is n-divided (for example, n=5 divisions), and accordingly, the skew speed acquired for every 20 seconds can be acquired for every four seconds by calculating the skew speed for each mark M (the first mark M1 to the fifth mark M5). Accordingly, in such a case, there is no problem that the endless belt 8 runs off before the next sampling or the left limit sensor 51 and the right limit sensor 52 are operated.

In addition, since the skew speed is calculated for each mark M (the first mark M1 to the fifth mark M5), a tolerance of the positions of the first mark M1 to the fifth mark M5 does not needed to be considered. In other words, the skew speed can be calculated at high precision that is the same as in a case where only one mark M is disposed.

In addition, the sampling points can perform an n-division operation for a time during which the endless belt 8 travels one cycle.

The belt skew correction controlling method according to Another Embodiment 1 includes a skew speed detecting process (S2) for detecting the skew speed of the wound endless belt 8, a deviation calculating process (S3) for calculating a difference between the skew speed acquired in the skew speed detecting process (S2) and an initial target value of “0”, and a roller angle displacing process (S6, S7, and S10 to S12) for displacing the angle of the belt skew correcting roller 7, as a skew correcting roller that is wound by the endless belt 8 and can be inclined, to a side on which the value acquired in the deviation calculating process (S3) becomes closer to the initial target value of “0”. In the skew speed detecting process (S2), the skew speed of the endless belt 8 is calculated by n-dividing (here, n is an integer equal to or larger than two) of one cycle of the endless belt and measuring the first mark M1 to the fifth mark M5 (for example, for a case of n=5) that are determined sampling points.

According to Another Embodiment 1, the division process is performed by using n=5. However, the invention is not limited thereto.

In addition, in Another Embodiment 1, the first mark M1 to the fifth mark M5 as the sampling points are positions determined by dividing one cycle of the endless belt.

In addition, it is preferable that the division process is performed to have equal lengths of divisions. In such a case, it is possible to have the load of the control device 46 divided without being concentrated.

A belt transportation device 20 according to Another Embodiment 1 includes a driving roller 6 that is driven by a transport driving motor 9 as an example of a power source, a driven roller 5 that is held to be rotatable, an endless belt 8 that is wound around the driving roller 6 and the driven roller 5, a belt skew correcting roller 7 that corrects the skew of the endless belt 8 by being brought into contact with a face of the endless belt 8, a skew speed sensor 47 as a detector that detects the position of the endless belt 8 in the width direction of the endless belt 8, and a control device 46 as a control unit that calculates a difference between each skew speed calculated based on a signal from the skew speed sensor 47 and an initial target value of “0” by disposing a first mark M1 to a fifth mark M5 (for example, for a case of n=5) as sampling points determined by n-dividing (here, n is an integer equal to or larger than two) one cycle of the endless belt and displaces the angle of the belt skew correcting roller 7 to a side on which the calculated value becomes closer to the initial target value of “0”.

A recording apparatus 100 according to Another Embodiment 1 includes a transport unit 2 as a transport member that holds and transports a paper sheet P as an example of a recording medium and a recording unit 3 that performs a recording operation for the transported paper sheet P, wherein the transport unit 2 is the belt transport device 20.

Another Embodiment 2

A belt skew correction device 1 according to an embodiment of the invention, a belt transportation device 20 having the belt skew correction device 1, and a recording apparatus 100 having the belt transportation device 20 basically have the above-described configurations. However, the configurations can be changed or omitted partly without departing from the gist of the invention.

In addition, the invention is not limited to the above-described embodiments and can be changed in various forms within the scope of the invention defined by the claims. It is apparent that such changes belong to the scope of the invention.

What is claimed is:

1. A belt skew correction controlling method comprising:

detecting a skew speed of a wound endless belt, wherein a transport face of the endless belt is formed by the endless belt being tightly extended between a driving roller and a driven roller;

calculating a difference between the skew speed that is acquired in the detecting of the skew speed and the initial target value;

determining whether a value acquired in the calculating of the difference is within a predetermined range;

maintaining an angle of a skew correcting roller that is wound around the endless belt and can be inclined, by an inclination mechanism which can be selectively driven, such that the inclination mechanism is not driven in a case where the value is determined to be within the predetermined range in the determining of whether the value is within the predetermined range, wherein the skew correcting roller is located between the driving roller and driven roller and contact the portion of the endless belt which is not the transport face; and displacing the angle of the skew correcting roller to a side on which the value acquired in the calculating of the difference becomes closer to the initial target value by driving the inclination mechanism in a case where the value is determined to be out of the predetermined range in the determining of whether the value is within the predetermined range.

2. The belt skew correction controlling method according to claim 1 further comprising:

determining whether the value acquired in the calculating of the difference is positive or negative in a case where the value is determined to be out of the predetermined range in the determining of whether the value is within the predetermined range; and setting the target value to a positive value in the predetermined range in a case where the value is determined to be positive in the determining of whether the value is positive or negative, and setting the target value to a negative value in the predetermined range in a case where the value is determined to be negative in the determining of whether the value is positive or negative, wherein the angle of the skew correcting roller is displaced such that the value acquired in the calculating of the difference approaches the set target value set in the setting of the target value, in the displacing of the angle of the skew correcting roller.

3. The belt skew correction controlling method according to claim 2, wherein, in the setting of the target value, the positive value is a maximum value within the predetermined range, and the negative value is a minimum value within the predetermined range.

4. The belt skew correction controlling method according to claim 1, further comprising:

determining whether the position of the endless belt is within an allowed range by using a width-direction position detecting sensor of the endless belt in a case where the value is determined to be within the predetermined range in the determining of whether the value is within the predetermined range; and performing the maintaining of the angle of the skew correcting roller in a case where the position of the endless belt is determined to be within the allowed range in the determining of whether the position of the endless belt is in the allowed range and performing the displacing of the angle of the skew correcting roller in which the angle of the skew correcting roller is displaced to a side on which the position of the endless belt is within the allowed range in a case where the position of the endless belt is determined to be out of the allowed range.

5. A belt transportation device comprising:

a driving roller that is driven by a power source;

a driven roller that is held to be rotatable;

an endless belt that is wound around the driving roller and the driven roller;

wherein a transport face of the endless belt is formed by the endless belt being tightly extended between the driving roller and the driven roller;

a skew correcting roller that corrects skew of the endless belt by being brought into contact with a face of the endless belt, wherein the skew correcting roller is located between the driving roller and driven roller and contact the portion of the endless belt which is not the transport face;

an inclination mechanism which controls the angle of the skew correcting roller and which can be selectively driven;

a skew speed detector that detects a skew speed of the endless belt in the width direction of the endless belt; and a control unit that:

calculates a difference between the skew speed acquired by the skew speed detector and an initial target value, determines whether the calculated value is within a predetermined range, maintains the angle of the skew correcting roller and does not drive the inclination mechanism in a case where the calculated value is determined to be within the predetermined range, and displaces the angle of the skew correcting roller to a side on which the calculated value becomes closer to the initial target value by driving the inclination mechanism in a case where the calculated value is determined to be out of the predetermined range.

6. A recording apparatus comprising:

a transport unit that holds and transports a recording medium; and a recording unit that performs a recording operation for the transported recording medium, wherein the transport unit is the belt transportation device according to claim 5.

7. The belt transportation device according to claim 5, wherein the control unit further:

determines whether the value acquired in the calculating of the difference is positive or negative in a case where the value is determined to be out of the predetermined range in the determining of whether the value is within the predetermined range, and sets the target value to a positive value in the predetermined range in a case where the value is determined to be positive in the determining of whether the value is positive or negative, and setting the target value to a negative value in the predetermined range in a case where the value is determined to be negative in the determining of whether the value is positive or negative, wherein the angle of the skew correcting roller is displaced such that the value acquired in the calculating of the difference approaches the set target value set in the setting of the target value, in the displacing of the angle of the skew correcting roller.

8. The belt transportation device according to claim 7, wherein, in the setting of the target value, the positive value is a maximum value within the predetermined range, and the negative value is a minimum value within the predetermined range.

9. The belt transportation device according to claim 5, wherein the control unit further:

determines whether the position of the endless belt is within an allowed range by using a width-direction position detecting sensor of the endless belt in a case where the value is determined to be within the predetermined range in the determining of whether the value is within the predetermined range; and maintains of the angle of the skew correcting roller in a case where the position of the endless belt is determined to be within the allowed range in the determining of whether the position of the endless belt is in the allowed range and performing the displacing of the angle of the skew correcting roller in which the angle of the skew correcting roller is displaced to a side on which the position of the endless belt is within the allowed range in a case where the position of the endless belt is determined to be out of the allowed range.

* * * * *